Patented Nov. 10, 1936

2,060,110

UNITED STATES PATENT OFFICE 2,060,110

HYDRAULIC PRESSURE FLUID

Burton Paxton, Chicago, Ill., assignor to Chicago Hydraulic Oil Co., a corporation of Illinois No Drawing. Application September 7, 1934,
Serial No. 743,113

17 Claims. (Cl. 252—5)

The invention relates to an improved liquid composition of matter and more particularly to a hydraulic pressure fluid adapted for use as a hydraulic medium in hydraulic brake systems, shock absorbers, or other fluid pressure actuated mechanism.

In closed hydraulic brake systems employing a liquid medium for transmission and distribution of the operating force, it is highly desirable to have a liquid medium which will maintain a constant pressure within the system at all temperatures.

It is, therefore, an object of the invention to provide a hydraulic pressure fluid having a suitably low freezing point so that it will not congeal in winter and a suitably high vapor pressure so that it will not volatilize at higher summer temperatures.

Another object is to provide a hydraulic pressure fluid which will afford good lubrication qualities and which will possess an evener range of viscosity over the entire range of temperatures.

Another object is to provide a fluid of the character referred to having no deteriorating or corrosive effect either upon rubber or metals, particularly copper, composing the various parts of a brake system and mechanism.

Another object is to provide a hydraulic pressure fluid composition including an element which tends to prevent loss of the liquid by seepage because of its tendency to congeal in any opening through which it may seep upon contacting atmosphere.

The foregoing and such other objects of the invention as will appear hereinafter as the description proceeds will be more readily understood from a perusal of the following specification:

The improved hydraulic fluid preferably includes glucose, a suitable inert lubricating liquid, such as glycerine, alcohol and water. To this may be added, in minute proportions, a suitable rust inhibitor, such as for example, an alkaline chromate. The exact proportions of the ingredients to be mixed depends upon the particular range of temperatures for which the composition fluid is to be adapted. Hence, for use where the temperature range is extremely low, the glucose content may be as low as 5%, whereas for higher temperature ranges, 20% glucose may be desirable.

A suitable quantity of the lubricant, such as glycerine, may be added to the glucose to constitute a glucose-glycerine mixture of 25% of the whole and the remaining 75% of the fluid is composed of alcohol and water preferably in equal parts.

It has been found that the resulting hydraulic pressure fluid has an evener range of viscosity and a higher lubricating value than commercially known hydraulic pressure fluids and no deteriorating effect upon rubber packing. To overcome any corrosive effect upon metals, a small quantity of a suitable rust inhibitor, such as for example, an alkaline chromate—either sodium or potassium—may be added.

The glucose, in addition to providing a base for the fluid serves efficiently to prevent loss of the fluid by seepage through joints and connections because of its tendency to form a sticky mass on the outside of an opening upon its coming into contact with the atmosphere. This is because the alcohol and water present during seepage evaporate and leave the sticky glucose body in said opening.

When the lubricating value of the improved hydraulic pressure fluid is not required, the glycerine content may be omitted and the amount of alcohol and water increased proportionally. 5 to 30% diethylene-glycol-monoethyl-ether, which lies between alcohol and glucose, may be added to the 20 to 5% glucose in place of glycerine, and a proportionate quantity of alcohol and water in substantially equal parts added. The alkaline chromate may be added to either of these compositions if desired.

Ethyleneglycol, which does not quite have the body of glycerine, but is more depressing in freezing than alcohol or diethylene-glycol-monoethyl-ether, also has been found to be a suitable substitute lubricant for glycerine. The proportion of ethyleneglycol may range from 5 to 30% and the glucose from 20 to 5%, with the remainder alcohol and water in equal proportions.

Another pressure fluid mixture which is satisfactory constitutes 5 to 75% glucose and substantially equal parts of ethyleneglycol and water, with or without alkaline chromate. Glucose in such proportions as 5 to 75% may also be used in any of the foregoing compositions if desired, however, it is not to advantage when the fluid is for use in extremely low temperature ranges.

Heat is not essential to the preparation and mixing of the various ingredients constituting the improved hydraulic pressure fluids, but sufficient heat preferably is applied while mixing to insure complete assimilation of the ingredients.

Although specific proportions have been set forth herein as constituting inexpensive commercially practical hydraulic pressure fluids, it is to be understood that satisfactory results may be obtained with fluids composed of the combinations of ingredients set forth in the foregoing in proportions varying from the proportions set forth in the foregoing, it is not desired to limit the invention to the exact proportions recited as the most practical but also to such proportions as fall within the spirit of the invention in its broadest aspects and the scope of the appended claims.

I claim:

1. A fluid mixture composed of glucose from 5 to not more than 20%, glycerine 20 to 5%, and a 75% mixture of equal parts of water and alcohol.

2. A hydraulic pressure fluid composed of glucose, glycerine, alcohol and water, the glycerine constituting 5 to 20% of the fluid.

3. A hydraulic pressure fluid including glucose, alcohol, and water, the alcohol and water being in equal parts and constituting more than 80% of the fluid.

4. A hydraulic pressure fluid including glucose, alcohol, water, and a minute quantity of alkaline chromate, the alcohol and water being in equal parts and constituting more than 80% of the fluid.

5. A hydraulic pressure fluid including glucose, and equal parts of alcohol and water, the glucose content being less than 20% of the whole.

6. A hydraulic fluid including glucose, alkaline chromate and equal parts of water and alcohol, the glucose content being less than 20% of the whole.

7. A hydraulic pressure fluid including 40 to 47½% alcohol, 40 to 47½% water, and 20 to 5% glucose.

8. A hydraulic pressure fluid including glucose, alcohol and water, the glucose constituting less than 20% of the whole.

9. A hydraulic pressure fluid including glucose, alcohol, water, and a rust inhibitor, the glucose constituting less than 20% of the whole.

10. A hydraulic pressure fluid including an admixture of glucose and glycerine, constituting not more than 25% by volume, and an admixture of equal parts of alcohol and water.

11. A hydraulic pressure fluid including glucose 5 to not more than 20%, a lubricant 20 to 5%, and a mixture of equal parts of alcohol and water 75%.

12. A hydraulic pressure including glucose, glycerine, alcohol and water, the glucose constituting 5 to 20% of the fluid.

13. A hydraulic pressure fluid including 75% alcohol and water in equal parts, 20 to 5% glycerine and the remainder glucose.

14. A hydraulic pressure fluid including glucose 5 to not more than 20%, a lubricant 20 to 5%, and a mixture of alcohol and water 75%.

15. A hydraulic pressure fluid including a 75% alcohol and water mixture, 20 to 5% glycerine, and the remainder glucose.

16. A hydraulic pressure fluid including glucose, a lubricant, alcohol and water, the glucose constituting less than 20% of the whole.

17. A hydraulic pressure fluid composed of glucose, glycerine, alcohol and water, the glycerine constituting not less than 5% of the fluid.

BURTON PAXTON.